United States Patent
Long et al.

[11] Patent Number: 5,476,417
[45] Date of Patent: Dec. 19, 1995

[54] BENT BLADE HOLDER APPARATUS AND METHOD

[76] Inventors: John W. Long, 12203 Nicholas St., Omaha, Nebr. 68154; David L. Thiede, 14825 N. 72nd St., Omaha, Nebr. 68122

[21] Appl. No.: 293,285
[22] Filed: Aug. 22, 1994
[51] Int. Cl.⁶ ................................................. A22C 17/04
[52] U.S. Cl. ........................................ 452/127; 452/121
[58] Field of Search ................................ 452/125, 127, 452/171

[56] References Cited

U.S. PATENT DOCUMENTS

| | | | |
|---|---|---|---|
| 2,715,427 | 8/1955 | Townsend | 146/130 |
| 3,197,808 | 8/1963 | Mears | 17/1 |
| 3,546,737 | 12/1970 | Neebel et al. | 17/1 |
| 3,613,154 | 10/1971 | Townsend | 452/125 |
| 3,685,095 | 8/1972 | Metro | 17/1 |
| 3,771,196 | 11/1973 | Doerfer et al. | 17/1 R |
| 3,849,836 | 11/1974 | Bernard et al. | 452/171 |
| 4,009,652 | 3/1977 | Anderson | 99/590 |
| 4,189,806 | 2/1980 | Van Heyningen | 17/52 |
| 4,970,755 | 11/1990 | Leblanc | 452/134 |
| 4,979,269 | 12/1990 | Norrie | 452/171 |
| 5,090,939 | 2/1992 | Leblanc | 452/127 |
| 5,234,371 | 8/1993 | Andre et al. | 452/171 |
| 5,288,264 | 2/1994 | Braeger | 452/127 |

FOREIGN PATENT DOCUMENTS

| | | |
|---|---|---|
| 1079114 | 2/1977 | Canada . |
| 1010757 | 5/1977 | Canada . |
| 7806432 | 12/1978 | Netherlands . |

*Primary Examiner*—Willis Little
*Attorney, Agent, or Firm*—John A. Beehner

[57] ABSTRACT

A bent blade holder for receiving, bending and supporting a flexible blade in an automatic skinning machine for trimming a non-linear layer of unwanted material from a meat product. The bent blade holder has a base plate having a base curved surface of a size and shape for removably receiving the flexible blade, a clamping plate adapted to be removably secured to the base plate and having a clamping curved surface substantially conforming to the base curved surface and means for removably securing the clamping plate to the base plate. The blade is removably secured between the base plate and the clamping plate and bent to conform to the base and clamping curved surfaces. A meat product is transported to the blade and maintained in trimming engagement therewith such that a portion of material conforming to the curve of the blade is trimmed from the meat product.

8 Claims, 3 Drawing Sheets

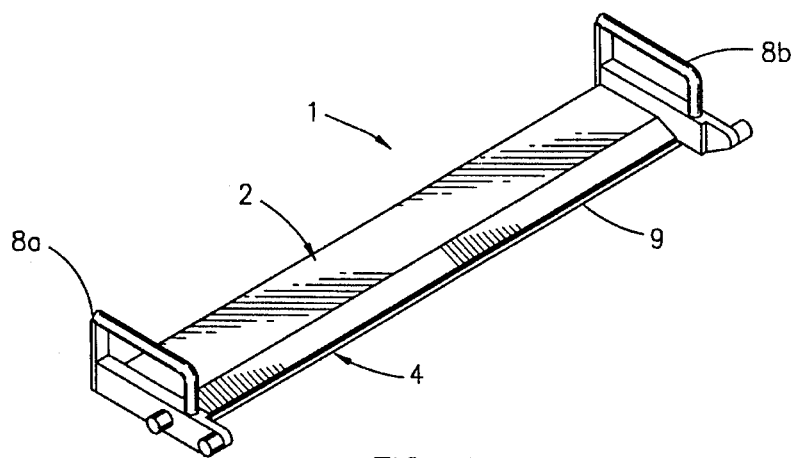
FIG. 1
PRIOR ART
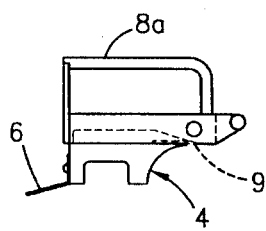
FIG. 2
PRIOR ART
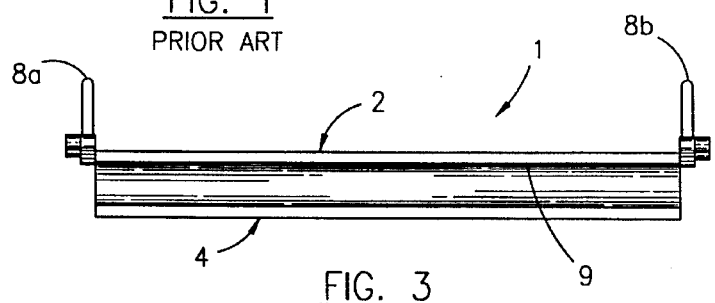
FIG. 3
PRIOR ART
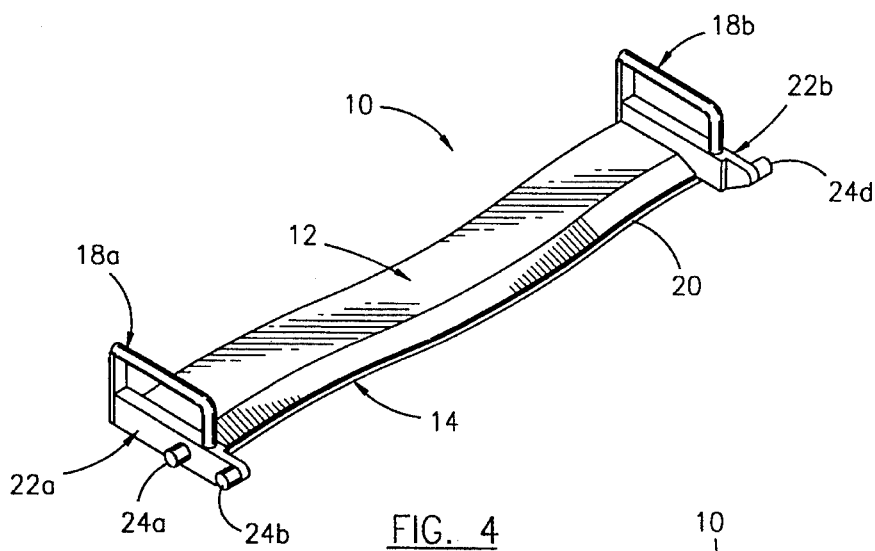
FIG. 4
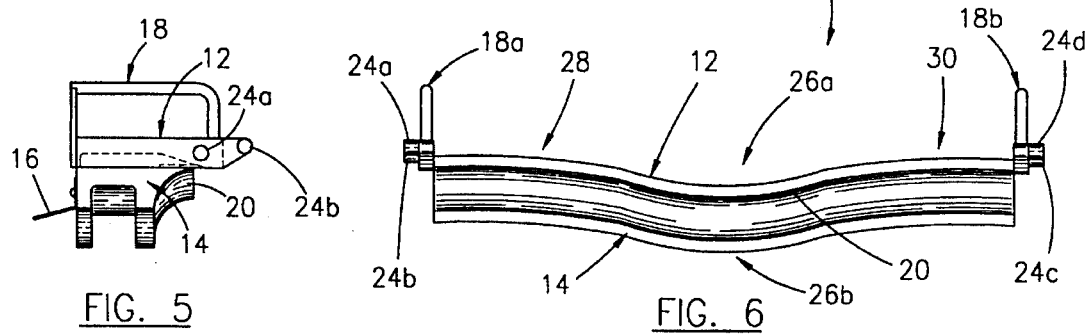
FIG. 5
FIG. 6

BENT BLADE HOLDER APPARATUS AND METHOD

BACKGROUND OF THE INVENTION

1. Technical Field

The method and apparatus of this invention relate generally to an apparatus and method for trimming a curved or nonlinear portion of unwanted material from the meat product. More specifically, it relates to an apparatus and method of automatically feeding a meat product to an automatic skinning or de-rinding machine for trimming portions from a meat product which is of a generally rounded shape such as butts (beef, pork, sirloin, etc.) short ribs, beef loins and the like. Meat "muscles" or "products" as used herein are meant to refer broadly to beef, pork, poultry, fish and the like. Materials to be trimmed may be fat, membranes, skin, connective tissue, gristle, bone, or the like. Machines for accomplishing such tasks are referred to in the art as skinning, trimming, or de-rinding machines.

Currently, extended, rounded meat products must usually be trimmed by hand or using automatic feed machines utilizing "straight" blades. While hand trimming can be quite accurate, it creates the possibility of serious injury to the hands. Additionally, there is a large reduction in efficiency and production capacity due to the time required to perform the numerous hand strokes required. Alternatively, trimming using a straight blade, while somewhat faster and safer than trimming by hand, also has large inefficiencies. These are primarily due to the tangential cutting resulting from using a straight blade on a rounded product. Consequently, it is highly desirable to automate the process of trimming extended or rounded meat products, such automation leads to enhanced ergonomics, increased safety, yield, and production.

The present invention is adapted to be used on automatic meat trimmers of the type described generally in our U.S. Pat. No. 5,236,323 which is herein incorporated by reference, or any of a wide variety of automatic trimming machines. Specific examples of such machines are the Maja GEA421, SBA420, and ESB441 series machines. However, the invention's use is not limited to these machines.

2. Description of the Prior Art

Prior art devices for automatically trimming unwanted portions from meat products are well known in the art. However, these devices generally employ a "straight" trimming blade. Consequently, they work best with meat products which are generally flat. Use of these machines with rounded may have the undesirable characteristic of trimming off only a portion of the fat, or perhaps worse, trimming too deeply and trimming off a portion of the meat itself.

Consequently, the trimming of an unwanted portion from a generally rounded product such as, but not limited to, butts, beef loins, top butts, short ribs, hams and the like, had to be accomplished by hand either using a knife or a manual membrane skinning machine. These methods are extremely dangerous and or time-consuming.

Townsend, U.S. Pat. No. 2,715,427, discloses a fatting attachment for a skinning machine adapted to remove fat from a ham. Townsend's invention includes a blade which may be angled at one end so as to trim a linearly increasing amount of fat from the ham. The amount of fat to be trimmed varies linearly along the length of the blade beginning at one value at one end and increasing gradually and continuously throughout the remainder of the blade. There is no disclosure in the Townsend patent of a blade which may be varied in curvature in a non-linear fashion throughout its width.

Consequently, there is a great need for an apparatus which is capable of automatically skinning these generally rounded, irregularly shaped types of meat products.

A primary objective of the present invention is to provide an apparatus capable of automatically trimming irregular or rounded shaped products efficiently and with minimum risk to operator safety.

Another object of the present invention is to provide an apparatus and method of efficiently and automatically removing unwanted material such as fat, membranes and the like from rounded, irregularly shaped meat products. Such products might include, but are not limited to, butts, beef loins, top butts, short ribs, hams and the like.

Another object of the present invention is to provide a bent blade holder which is capable of trimming a variety of different sizes and types of meat products.

Another object is to provide an apparatus which will accommodate a variety of blade shapes.

Another object is to provide an apparatus which can accommodate a variety of blade types.

Still another object of the present invention is to provide an apparatus which is capable of trimming on slicing meat products of a variety of consistencies and temperatures.

Finally, an object of the present invention is to provide an apparatus which is capable of automatic position adjustment to accommodate meat products of irregular shape.

SUMMARY OF THE INVENTION

A bent blade holder for receiving, bending and supporting a flexible blade in an automatic skinning machine for trimming a nonlinear layer of unwanted material from a meat product. The bent blade holder has a base plate having a base curved surface of a size and shape for removably receiving the flexible blade, a clamping plate adapted to be removably secured to the base plate and having a clamping curved surface substantially conforming to the base curved surface and means for removably securing the clamping plate to the base plate. The blade is removably secured between the base plate and the clamping plate and bent to conform to the base and clamping curved surfaces. A meat product is transported to the blade and maintained in trimming engagement therewith such that a portion of material conforming to the curve of the blade is trimmed from the meat product.

BRIEF DESCRIPTION OF THE DRAWINGS

FIGS. 1, 2 and 3 are perspective, side and front views, respectively, of the prior art blade holders.

FIGS. 4, 5 and 6 perspective, side and front views, respectively, of one embodiment of the bent blade holder.

DESCRIPTION OF PREFERRED EMBODIMENT

Figure 7:
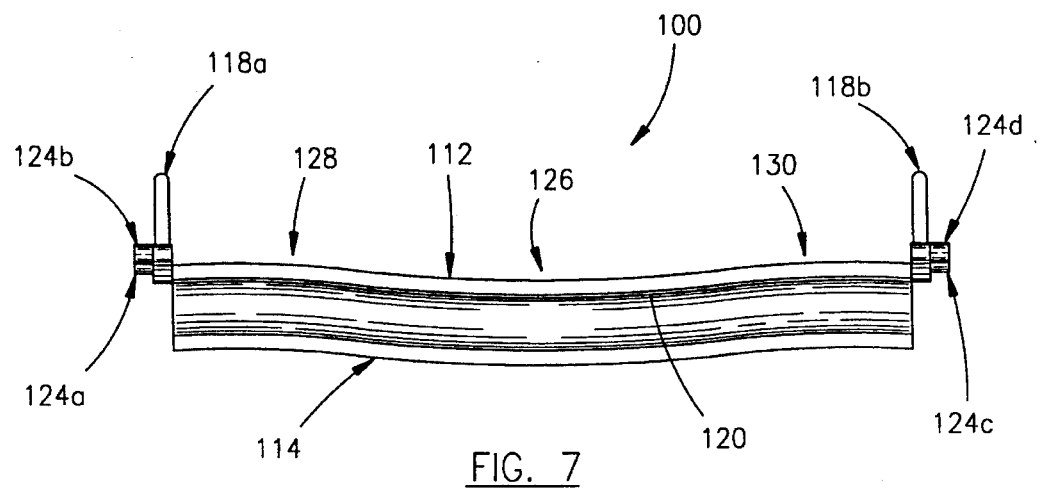
FIGS. 7, 8 and 9 are front views of bent blade holders of the present invention showing differing degrees of curvature therein.

One of the objectives of the invention is to provide a bent blade holder which will work for a variety of irregularly shaped, different meat product types having different curvatures. The bent blade holder is adapted to fit on conventional automatic skinning machines such as the MAJA GEA421, SBA 420, ESB 441, VBA500 and the like. However, it will work with any conventional skinning machine. A particular blade shape and curvature may be referred to as a "blade profile." Since the blade should work with a variety of products, it is desirable to have a variety of blade holder profiles. A rigid assignment of meat types to blade holder profiles is not possible as use of a particular blade profile involves a certain degree of intuition, experience, and preference on the part of the operator. Consequently, to at least some degree, several meat products may be accommodated by more than one blade profile. The blade profile is selected with consideration to such factors as the amount of fat on the particular muscle and by the thickness of the fat cover specified for the finished trimmed meat product. Examples of products for which the present invention provides an effective trimming are butts, short ribs, beef loins, top butts, hams and the like. While this list is not complete or exclusive, it gives examples of products which are well suited to these blade shapes.

FIGS. 1, 2 and 3 are perspective, side and front view, respectively, of the prior art blade holder 1. As can be readily seen in the figures, the blade holder 1 of the prior art configuration is substantially straight. Clamping and base mounting plates 2 and 4 respectively are substantially straight pieces wherein blade 9 is held therebetween. Since the blade 9 is substantially flexible, it conforms to the shape of the clamping and base plates 2 and 4. Therefore, with the prior art holder 1, blade 9 is substantially straight. Consequently, the prior art blade holder of FIGS. 1, 2 and 3 is adapted to trim a substantially uniform thickness portion from a flat meat product.

FIGS. 4, 5 and 6 are perspective, side and front views, respectively, of the bent blade holder of the present invention. It is immediately apparent from viewing these figures that the bent blade holder be of the present invention comprises a convex clamping and base curved portions 26a and 26b respectively which differentiates it from the prior art blade holder of FIGS. 1, 2 and 3. The bent blade holder 10 of the present invention also comprises clamping and base mounting plates 12 and 14 respectively with blade 20 held therebetween. Flexibility of blade 20 allows it to conform to the shape of the clamping and base mounting plates 12 and 14. As shown in the figures, flexible blade 20 is "sandwiched" between clamping mounting plate 12 and base mounting plate 14 which comprise co-registered, convex clamping and base curves 26a and b. Since blade 20 is comprised of a flexible material, sandwiching of the blade 20 between plates 12 and 14 causes blade 20 to conform to the shape of plates 12 and 14.

In addition to convex clamping and base curves 26a and b, blade holder apparatus plates 12 and 14 comprise outer concave shaped portions 28 and 30. Again, the flexibility of blade 20 allows it to conform to the shape of the clamping and base plates 12 and 14. Thus, the blade holder apparatus 10 produces a blade shape resembling an "inverse bell curve" when viewed from the front as shown in FIG. 6. This general inverse bell shape to the blade allows products having generally rounded lower portions and flatter outer portions to be accurately and effectively trimmed using the blade holder apparatus 10 of this invention (See FIG. 10).

Figure 10:
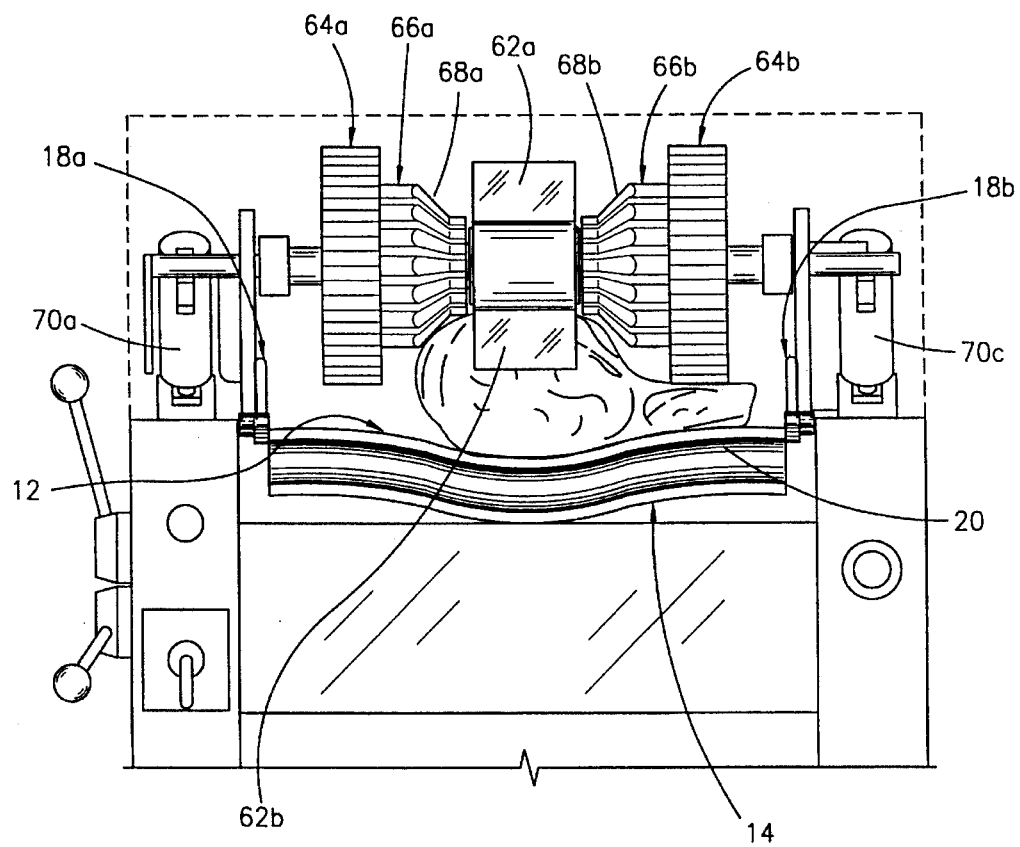
FIG. 10 is a front view showing the bent blade holder installed on an automatic skinning machine.
Figure 11:
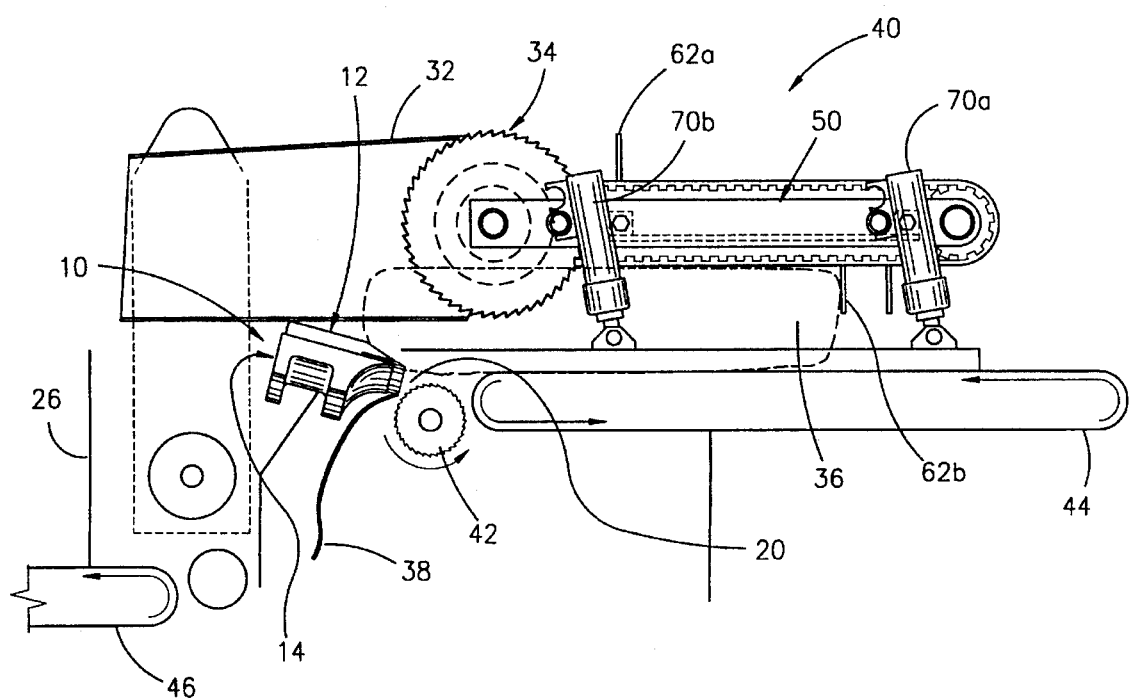
FIG. 11 is a side view of the bent blade holder installed on an automatic skinning machine.

Blade holder 10 comprises installation handles 18a and b for installing and removing blade holder 10 from the automatic trimming apparatus (FIGS. 10 and 11). Handles 18a and b are secured to mounting end plates 22a and b which are in turn secured to the ends of clamping and base mounting plates 12 and 14. Also shown in the figures are the mounting pins 24a–d which are used for guiding and locking the blade holder apparatus 10 into proper position. Finally, guide plate 6 is used for guiding blade holder apparatus 10 during installation into the automatic trimming apparatus of FIGS. 10 and 11.

Figure 8:
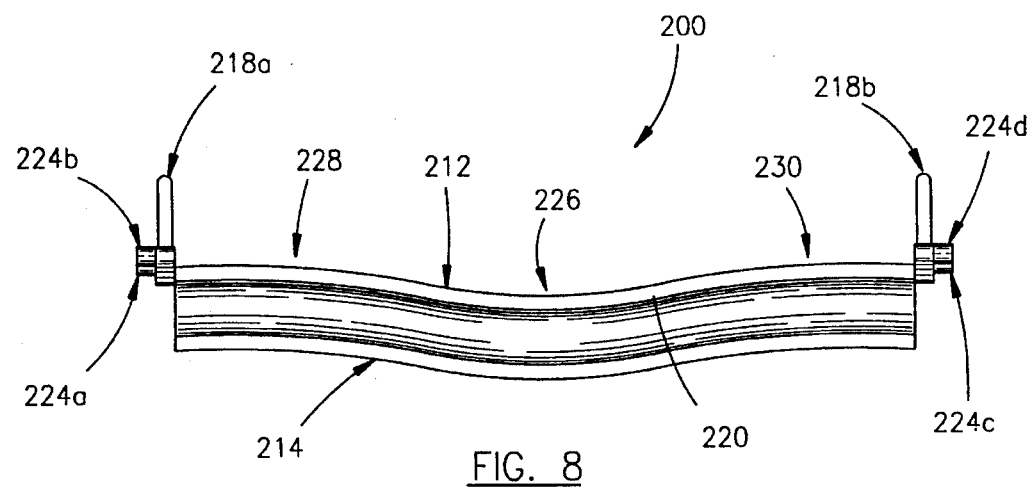
Figure 9:
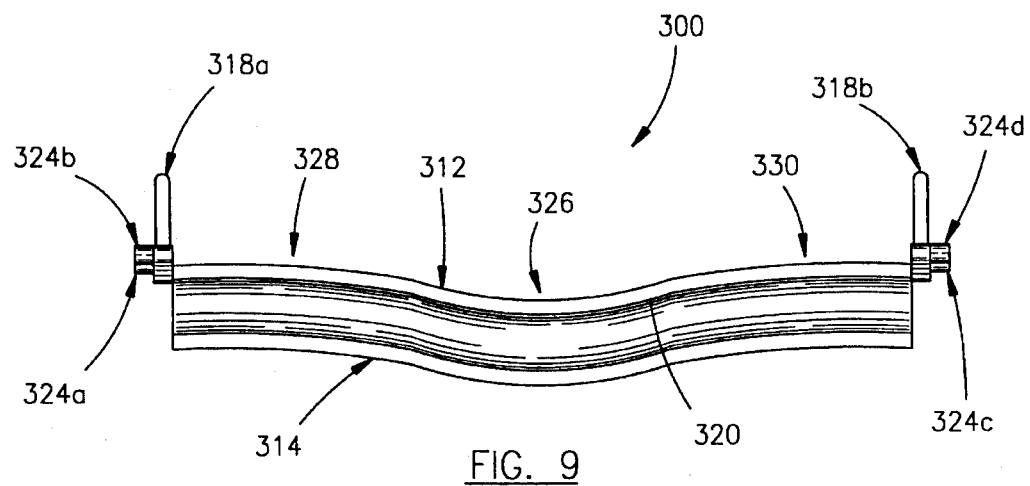

FIGS. 7, 8 and 9 are all front views of blade holders showing varying degrees of curvature therein. A selected one of the blade holders shown in FIGS. 7-9 having differing degrees of curvature, would be adapted for use on particular cuts of meat, such as butts, short ribs, beef loins, top butt, hams, etc. depending on such factors as the amount of fat on the particular muscle and the thickness of fat cover specified for the finished trimmed meat product. The transverse extent of the concave curved portion of the blade holder is preferably between 280 and 380 millimeters and the vertical depth of the curve is preferably between 1 and 100 millimeters for current automatic skinning machines. Therefore, the operator is able to select the blade holder having the appropriate curvatures adapted to efficient trimming of the particular meat product.

FIGS. 10 and 11 are front and side views, respectively, of the blade holder apparatus of the present invention installed on an example of a conventional automatic skinning machine. As mentioned above, the bent blade holder of the present invention is adapted to work on automatic skinning machines. Examples of such machines are the MAJA GEA421, SBA420, ESB441 and VBA500 series machines.

The trimming operation of the bent blade holder in conjunction with an automatic skinning machine is shown in FIGS. 10 and 11. The meat product 36 is transported by the feed conveyor 44 to press rollers 64a, b; and 66a, b and into trimming engagement with the flexible blade 20. In the preferred embodiment, flexible blade 20 is a stainless steel blade but it could alternately be any other cutting devices which could conform to the shape of the mounting plates. Press roller 64a, b; 66a, b are located above and slightly forward of the blade 20. When the meat product 36 is brought into contact with the press rollers 64a, b; 66a, b the teeth of the press rollers 68a and b engage the meat product 36, and in cooperation with paddle 62a and b and feed conveyor 44, move it rearward, bringing it into trimming engagement with trimming blade 20.

In one automatic skinning machine configuration, press rollers 66a, b comprises a plurality of paddle wheels including resilient fingers 67a and b and 68a and b attached circumferentially. Positioning of the press rollers 66a, b allows fingers 67a and b and 68a and b to engage the meat product 36. Additionally, press rollers 64a and b comprise teeth 63 to further facilitate engagement of the meat product 36 as shown in FIG. 10. Rotation of the press rollers 64a, b; 66a, b in cooperation with conveyor 56 and paddle 62a or b causes the meat product 36 to engage blade 20 causing material 38 to be trimmed therefrom. This is but one of the many automatic skinning machine configurations on which the present bent blade holder is adapted to work.

It will be observed from FIG. 11 that the amount of material 38 trimmed is equal to the distance between the blade 20 and the feed means 42. This distance, and consequently the amount of material trimmed, may be adjusted either manually as is commonly done with conventional skinning machines or automatically using some sensing device.

As also shown in the automatic skinning machine example of FIGS. 10 and 11, and as is well understood in the art, the base frame 50 has the ability to be pivoted in an upward direction, as well as in a rearward, or sideways direction, by means of four spring cylinders 70a–d. This allows the conveyor apparatus 40 to pivot about four independent points to accommodate irregularly shaped meat products 36 thereby maintaining continuous, even pressure thereon.

Once meat product 36 has been discharged from the rear of the apparatus by discharge means 46, the apparatus is ready to accommodate another meat product. The feed conveyor 44 transports another meat piece 36 to be trimmed into position, where the product 36 is engaged by paddle 62a or *b*. The product 36 is then transported cooperatively by feed conveyor 44 and paddle 62a or *b* to feed rollers 64a, b; 66a b which in cooperation with conveyor 44 and paddle 62a or *b*, brings the meat product 36 into trimming engagement with trimming blade 20 and the entire trimming cycle is started again.

It is obvious that numerous other modifications and variations of the present invention are possible in view of the above teachings. For example, an important modification previously mentioned is the use of various blade profiles to accommodate various meat product consistencies and sizes. Another modification would be to incorporate an adjustment means for adjusting the height of the blade from the feed roller in order to further accommodate different meat types and trim amounts. Such an adjustment means might be manual or automatic, for example where an X-ray apparatus senses the fat depth and adjusts the blade accordingly. Finally, the means might be incorporated to adjust the blade profile in "real time" by adjusting the blade mounting plates.

Importantly, as noted earlier, there is no rigid correspondence or designation of meat type to blade profile. On the contrary, a particular meat type may be quite satisfactorily accommodated by different blade profiles. As is quite readily understood in the industry, the decision to use one configuration over another is determined, to some degree, by the operator's experience, knowledge and preference of what is most effective.

Therefore it is to be understood that the above description is intended in no way to limit the scope of protection of the claims and is representative only of the several possible embodiments of the present invention.

There has thus been shown and described an invention which accomplishes at least all of the stated objects.

We claim:

1. A bent blade holder for receiving, bending and supporting a flexible blade in an automatic skinning machine for trimming a non-linear layer of unwanted material from a meat product, the automatic skinning machine including a base frame, feed means extending forwardly of the flexible blade for transporting the meat product into trimming engagement with the flexible blade, feed roller means and press roller means for frictionally engaging the meat product therebetween, and drive means for engaging and moving the feed means, feed roller means and press roller means, such that the cooperative action of said feed means, said feed roller means, and said press roller means is operative to initiate and maintain trimming engagement of said meat product with said flexible blade, the bent blade holder comprising:

a base plate having a base curved surface of a size and shape for removably receiving said blade;

a clamping plate adapted to be removably secured to said base plate and having a clamping curved surface substantially conforming to said base curved surface and spaced therefrom to define an opening for receiving said flexible blade therein; and means for removably securing said clamping plate to said base plate such that said flexible blade received within said opening is and clamping curved surfaces; and mounting means for mounting said base plate and clamping plate on an automatic skinning machine base frame wherein cooperative movement of said press roller and said feed roller is operative to transport said meat product to said blade and to maintain trimming engagement therewith such that a portion of material conforming to the curve of said blade is trimmed therefrom.

2. The bent blade holder of claim 1 further comprising a guide plate means for facilitating the installation of said bent blade holder in said base frame.

3. The bent blade holder apparatus of claim wherein said base and clamping plate curves each comprise two generally convex shaped portions at the outer portions of said plate and a generally concave shaped portion therebetween and positioned substantially at the plate center thereby creating an "inverse bell shaped curve" appearance when viewed from the front of said holder.

4. The bent blade holder apparatus of claim 3 wherein the transverse extent of said generally concave shaped portion is between 280 and 380 millimeters and the vertical depth of said generally concave shaped portion is between 1 and 100 millimeters.

5. The bent blade holder apparatus of claim 1 wherein said base and clamping plates further comprise a front surface and wherein said base and clamping plate front surfaces lie substantially in a vertical plane.

6. In combination:

an automatic skinning machine for trimming a layer of unwanted material from a meat product, having a base frame, trimming means mounted on the base frame for trimming unwanted material from the meat product, feed means extending forwardly of the trimming means for transporting the meat product into trimming engagement with the trimming means, feed roller means and press roller means for frictionally engaging the meat product, drive means for engaging and moving the feed means, feed roller means, and press roller means, such that the cooperative action of said feed means, said feed roller means and said press roller means is operative to initiate and maintain trimming engagement of said meat product with said trimming means;

a flexible blade;

a bent blade holder for receiving, bending, and supporting said flexible blade in said automatic skinning machine said bent blade holder having, a base plate having a base curved surface of a size and shape for removably receiving said blade, a clamping plate adapted to be removably secured to said base plate and having a clamping curved surface substantially conforming to said base curved surface; and means for removably securing said clamping plate to said base plate wherein said blade is removably secured between said base plate and said clamping plate and bent to conform to said base and clamping curved surfaces; and mounting means for mounting said base plate and clamping plate on an automatic skinning machine base wherein cooperative movement of said press roller and said feed roller is operative to transport said meat product past said blade and into trimming engagement therewith such that a portion conforming to the shape of said blade is trimmed therefrom.

7. A method of trimming a layer of unwanted material from a meat product using an automatic skinning machine adapted to receive any one of a plurality of bent blade holders each having a different degree of curvature therein comprising:

providing an automatic skinning machine having a feed means, a press roller and a flexible trimming blade and a plurality of bent blade holders having different curvatures therein;

selecting a meat product to be trimmed;

selecting a bent blade holder adapted to removably receive said flexible trimming blade and having a curvature therein best corresponding to the shape and amount of material to be trimmed from said meat product;

installing said flexible trimming blade in said bent blade holder;

installing said bent blade holder and associated flexible trimming blade in said automatic skinning machine;

placing a meat product to be trimmed on said feed means;

advancing said meat product on said feed means to said press roller;

advancing said press roller in a direction to engage said meat product;

advancing said meat product into trimming engagement with said flexible trimming blade;

trimming said layer of material from said meat product corresponding to said selected blade holder curvature; and discharging said trimmed meat product from said trimmer.

8. The method of claim 7 wherein the step of providing a plurality of bent blade holders further comprises the step of:

providing a bent blade holder having, a base plate having a base curved surface of a size and shape for removably receiving said blade;

a clamping plate adapted to be removably secured to said base plate and having a clamping curved surface substantially conforming to said base curved surface;

means for removably securing said clamping plate to said base plate wherein said blade is removably secured between said base plate and said clamping plate and bent to conform to said base and clamping curved surfaces, and mounting means for mounting said base plate and clamping plate on an automatic skinning machine frame; wherein cooperative movement of said press roller and said feed roller is operative to transport said meat product to said blade and to maintain trimming engagement therewith such that a portion of material conforming to the curve of said blade is trimmed therefrom.

* * * * *